(12) United States Patent
Alberth, Jr. et al.

(10) Patent No.: US 9,426,625 B2
(45) Date of Patent: Aug. 23, 2016

(54) SYSTEM AND METHOD TO CONFIRM PARTICIPATION IN A CAR POOL

(71) Applicants: Willaim P Alberth, Jr., Prairie Grove, IL (US); Seang Yong Chau, Los Altos, CA (US)

(72) Inventors: Willaim P Alberth, Jr., Prairie Grove, IL (US); Seang Yong Chau, Los Altos, CA (US)

(*) Notice: Subject to any disclaimer, the term of this patent is extended or adjusted under 35 U.S.C. 154(b) by 182 days.

(21) Appl. No.: 14/091,562

(22) Filed: Nov. 27, 2013

(65) Prior Publication Data

US 2015/0149086 A1    May 28, 2015

(51) Int. Cl.
*G01C 21/10* (2006.01)
*H04W 4/02* (2009.01)
*H04W 4/04* (2009.01)
*G06Q 30/02* (2012.01)

(52) U.S. Cl.
CPC .............. *H04W 4/027* (2013.01); *G01C 21/10* (2013.01); *G06Q 30/0225* (2013.01); *G06Q 30/0236* (2013.01); *H04W 4/046* (2013.01)

(58) Field of Classification Search
CPC ... H04W 4/02; G01C 21/3438; G01C 21/10; H04M 1/67; G06Q 10/00; G06Q 10/06311; G06Q 10/10; G06Q 50/01; G06Q 50/188; B60R 25/00

USPC ............ 701/519, 527, 408, 468; 455/456.3; 705/6, 80, 14.7; 180/271; 707/812
See application file for complete search history.

(56) References Cited

U.S. PATENT DOCUMENTS

| | | | |
|---|---|---|---|
| 2006/0155460 A1* | 7/2006 | Raney | G01C 21/20 701/468 |
| 2008/0195428 A1* | 8/2008 | O'Sullivan | G06Q 10/00 705/6 |
| 2008/0277183 A1* | 11/2008 | Huang | B60R 25/00 180/271 |
| 2009/0248587 A1* | 10/2009 | Van Buskirk | G06Q 50/188 705/80 |
| 2010/0280884 A1 | 11/2010 | Levine et al. | |
| 2011/0066664 A1* | 3/2011 | Goldman | G06Q 10/10 707/812 |
| 2011/0223939 A1* | 9/2011 | Osann, Jr. | H04M 1/67 455/456.3 |
| 2013/0035846 A1* | 2/2013 | Shih-Chia | G06Q 10/06311 701/408 |
| 2013/0054505 A1 | 2/2013 | Ross et al. | |
| 2014/0207375 A1* | 7/2014 | Lerenc | H04W 4/02 701/527 |

* cited by examiner

*Primary Examiner* — Yuri Kan
(74) *Attorney, Agent, or Firm* — Jane H. Bu

(57) ABSTRACT

A method and an apparatus for confirming that two or more individuals' participation in a carpool where acceleration datum is collected from the individuals' associated devices. The acceleration datum of the devices is compared to determine that a first individual that is associated with the first device and at least a second individual that is associated with a second device traveled together in one single vehicle for a period of time to satisfy a carpool requirement. At least one of the individuals receives a benefit or incentive of the carpool.

20 Claims, 8 Drawing Sheets

310- Data from Alice and Becky
320- Data from Charlie

310- Data from Alice and Becky
320- Data from Charlie

SYSTEM AND METHOD TO CONFIRM PARTICIPATION IN A CAR POOL

FIELD OF THE INVENTION

The present invention relates to devices, systems, methods, and related computer program products for determining and confirming participation in a carpool program. More particularly, the present disclosure is directed to sensing that two or more passengers have traveled together in the same vehicle for a period of time to satisfy the relevant carpool requirements.

BACKGROUND OF THE INVENTION

Desire to conserve resources have led to efforts to incent users to carpool or use public transportation. Carpooling reduces pollution, and reduces the number of vehicles on the road. Aside from environmental benefits derived from carpooling, there are many "perks" and incentives associated with carpool. For example, special High Occupancy Vehicle ("HOV") or carpool lanes have been instituted in various locations and countries to provide an incentive to carpool. Vehicles are permitted in the designated carpool lanes if they contain two or more passengers depending on the carpool lane requirement of a particular location. In addition, many public and private establishments offer special parking spots reserved for carpools, certain highways and bridges offer reduced tolls for carpoolers, and employees may subsidize vans and buses to incent employees to carpool. There have also been several "carpool challenge" contests were participants compete for prizes and fame by carpooling.

Recognizing the significant benefits and practical incentives of carpooling many drivers will knowingly violate carpool regulations when they are driving alone. To deter the misuse of carpool incentives, violation of the carpool regulation may result in large fines. For example, in some locations a minimum HOV lane violation can subject a driver to a fine of nearly $500. In recent years, although there are many tools and mobile applications developed to help willing participants to organize carpooling and propose routes for carpools, there are no practical and easy management tools to help monitor and confirm the passengers' actual carpooling status other than by a visual confirmation of the passengers while they are in the vehicle. Therefore, there is a need for a user friendly and safe method and technology to confirm that individuals are actually carpooling in one single vehicle in real time so that carpool incentives can be properly distributed and administered, and the proper carpool participants can be awarded credit and incentives for their participation.

SUMMARY OF THE DESCRIPTION

Embodiments of the present disclosure are directed to systems, apparatus, and methods for intelligently determining if multiple persons have traveled together.

A method and apparatus of a device that determines that two or more individuals traveled or are traveling together in one single vehicle is described. In an exemplary embodiment, the method comprising: retrieving first acceleration datum from a first device associated with a first individual; retrieving second acceleration datum from a second device associated with a second individual; comparing the first acceleration datum and second acceleration datum to produce a comparison; and based on the comparison, determining that the first individual associated with the first device and the second individual associated with the second device traveled together for a period of time in one single vehicle.

In a further embodiment, a method comprising: receiving registration information from a first device and a second device, wherein a first individual is associated with the first device and a second individual is associated with the second device; receiving first acceleration data from the first device; receiving second acceleration data from the second device; comparing the first acceleration data and the second acceleration data to produce a comparison; and based upon the comparison, confirming that the first individual and second individual have traveled together in one single vehicle for a period of time and thus participated in the carpool.

In another embodiment, a device comprising: a processor; a transceiver configured to transmit and receive acceleration datum; a sensor configured to detect events related to the acceleration data; and a computer-readable medium having a plurality of instructions stored thereon, the plurality of instructions executable by the processor, the instructions for: recording, storing or retrieving acceleration datum; authenticating an individual user associating with the apparatus; transmitting the acceleration datum; and confirming that the user of the apparatus traveled together for a period of time with one or more other individuals in one single vehicle.

Other methods and apparatuses are also described.

Those of ordinary skill in the art will realize that these various embodiments of the present invention are illustrative only and are not intended to be limiting in any way. Other embodiments of the present invention will readily suggest themselves to such skilled persons having the benefit of this disclosure.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure. The present invention is illustrated by way of example and not limitation in the figures of the accompanying drawings in which like references indicate similar elements.

DETAILED DESCRIPTION

Reference now will be made in detail to embodiments of the present disclosure, examples of which are illustrated in the accompanying drawings. Wherever possible, the same reference numbers will be used throughout the drawings to refer to the same or like parts and/or components. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g., circuitry, dedicated logic, etc.), software (such as is run on a general-purpose computer system, a dedicated machine, or a device or mobile device), or a combination of both. Although the processes are described below in terms of some sequential operations, it should be appreciated that some of the operations described may be performed in different order. Moreover, some operations may be performed in parallel rather than sequentially.

Overview

Embodiments of the present disclosure including, among other things, a handheld or mobile device, including but not limited to a smart phone, PDA, Blackberry, tablet, iPad, iPod, Portable Navigation Device (PND), mobile route guidance device, mobile map ping device, mobile traffic updates device, vehicular navigation device, vehicular dashboard device, or otherwise a wearable device that can be carried by a person or stored in a vehicle (collectively hereinafter "device"); and a server. The device may be equipped with Wi-Fi, Bluetooth, and/or GPS capabilities that can allow connections to the Internet and other similarly capable devices. The device may be used to gather information about movements of an individual, particularly when the individual is in a vehicle. The data gathered is transmitted to a server where data is correlated and it may be determined that two or more individuals have traveled together in a single vehicle to satisfy certain carpool requirements. For the purpose of this application, the term vehicle should be afforded the broadest meaning, including but not limited to any transportation device, such as cars, trains, buses, ferries, or other means of public transportation.

Figure 1:
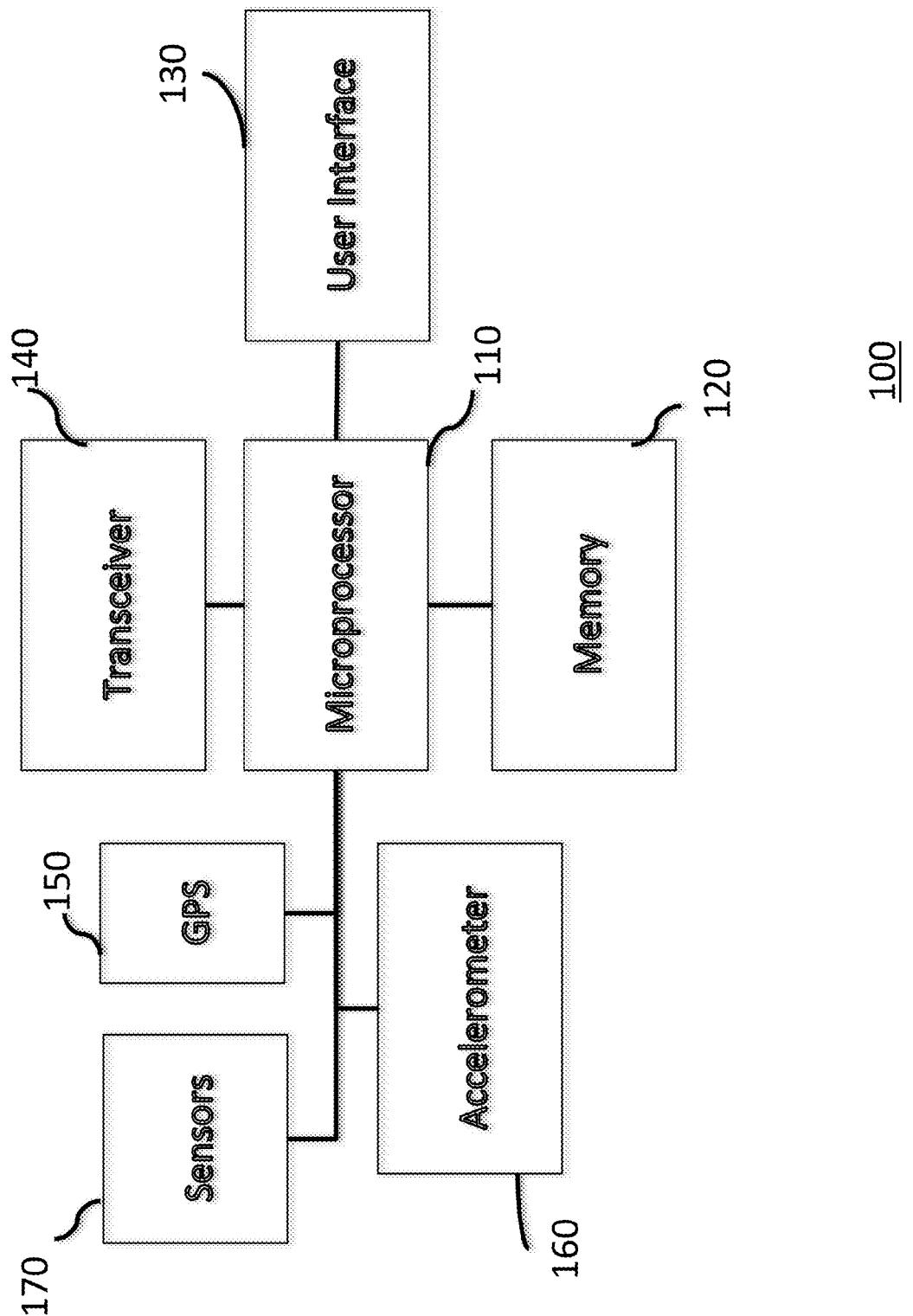
FIG. 1 is a block diagram of one embodiment of an exemplary device that can be used to confirm that two or more passengers have traveled together in the same vehicle for a period of time to satisfy the relevant carpool requirements.

FIG. 1 is a block diagram of one embodiment of a device 100 that may be used to determine that two or more individuals have traveled together in a single vehicle to satisfy certain carpool requirements. Device 100 as defined above may be a handheld device or a wearable device that can be carried with a person or be stored in a vehicle. The device includes a microprocessor or processor 110 that executes software or a set of software that may be stored in memory 120.

The terms "server," "microprocessor," and "processor" are intended to refer generally to data processing systems rather than specifically to a particular form factor for the server or processor. In some embodiments, the function of the server maybe executed on a device such as device 100.

The device 100 may include a user interface 130 which constitutes an electronic touch screen display; buttons; microphone; speaker; icons, sensors or other components configured to allow the user to generate a user input to control or influence device 100, to collect or receive data, or to inform or communicate to the user of an operating characteristic or data stored within the device.

The device 100 may include a transceiver 140 that is configured to transfer data into or out of device 100. The transceiver may include one or more of a USB port, Ethernet port, Bluetooth transceiver, cellular transceiver, NFC transceiver, or any other wired or wireless communication component. The microprocessor 110 is coupled to the transceiver and may use the transceiver to transfer data into or out of the device 100, or to receive or transmit instructions.

The term "coupled" is used in this disclosure to indicate that two or more elements, which may or may not be in direct physical or electrical contact with each other, co-operate or interact with each other.

Device 100 also may include a GPS receiver 150 which may be a Global Positioning System receiver, and may be configured to receive Glonass, Galileo, or other standard satellite or terrestrial based signals that can be used to determine, among other things, the location and time information of device 100.

Device 100 may include accelerometer or other equivalent or similar sensor 160, which is capable of measuring acceleration and/or producing acceleration data, or tilting motion and orientation of the device 100. The accelerometer may be a multi-axis device. Accelerometers may measure earth gravity which is about 9.8 meters/sec$^2$ with a vector pointed towards the center of the earth. As an individual moves with the vehicle, the accelerations from the vehicle movements can be measured by the accelerometer 160 and may be recorded in the memory 120. If the individual is moving up, such as in an elevator, the acceleration will be nearly directly opposed to gravity. In contrast, if the individual is in a vehicle accelerating from a stop light, the acceleration will be on a vector approximately 90 degrees from gravity depending on whether the vehicle of the individual is moving on an inclined surface, such as a hill.

Device 100 may include other sensor or sensors 170, such sensors may include but not limited to an electronic compass, one or more cameras, barometer, fingerprint sensors, or any other sensor that may be included in handheld devices, mobile devices or wearable devices.

In one embodiment, the components of device 100 may be contained in a single device. In another embodiment, the components of device 100 may be contained in multiple devices. For example, the accelerometer 160 may be in a first device, which can be in a communication with a second device that includes memory to store data from the accelerometer 160.

Figure 2A:
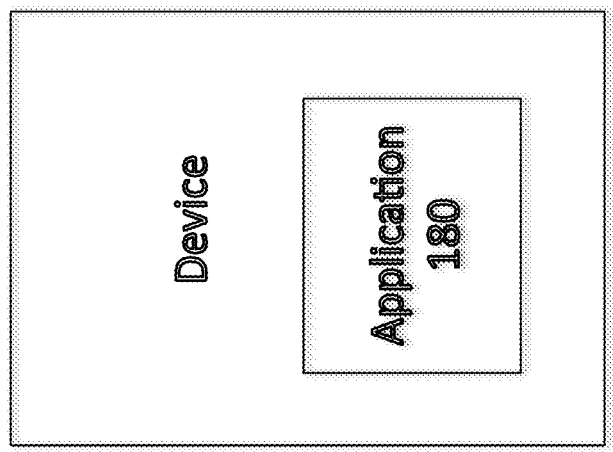
FIG. 2A illustrates one implementation of a mobile device of FIG. 1 which may be used in conjunction with the embodiments described herein.

FIG. 2A illustrates one implementation of a device 100. The device 100 is a mobile device that includes a mobile application 180 that is provided to or downloaded onto the mobile device 100 as described in more details below.

Figure 2B:
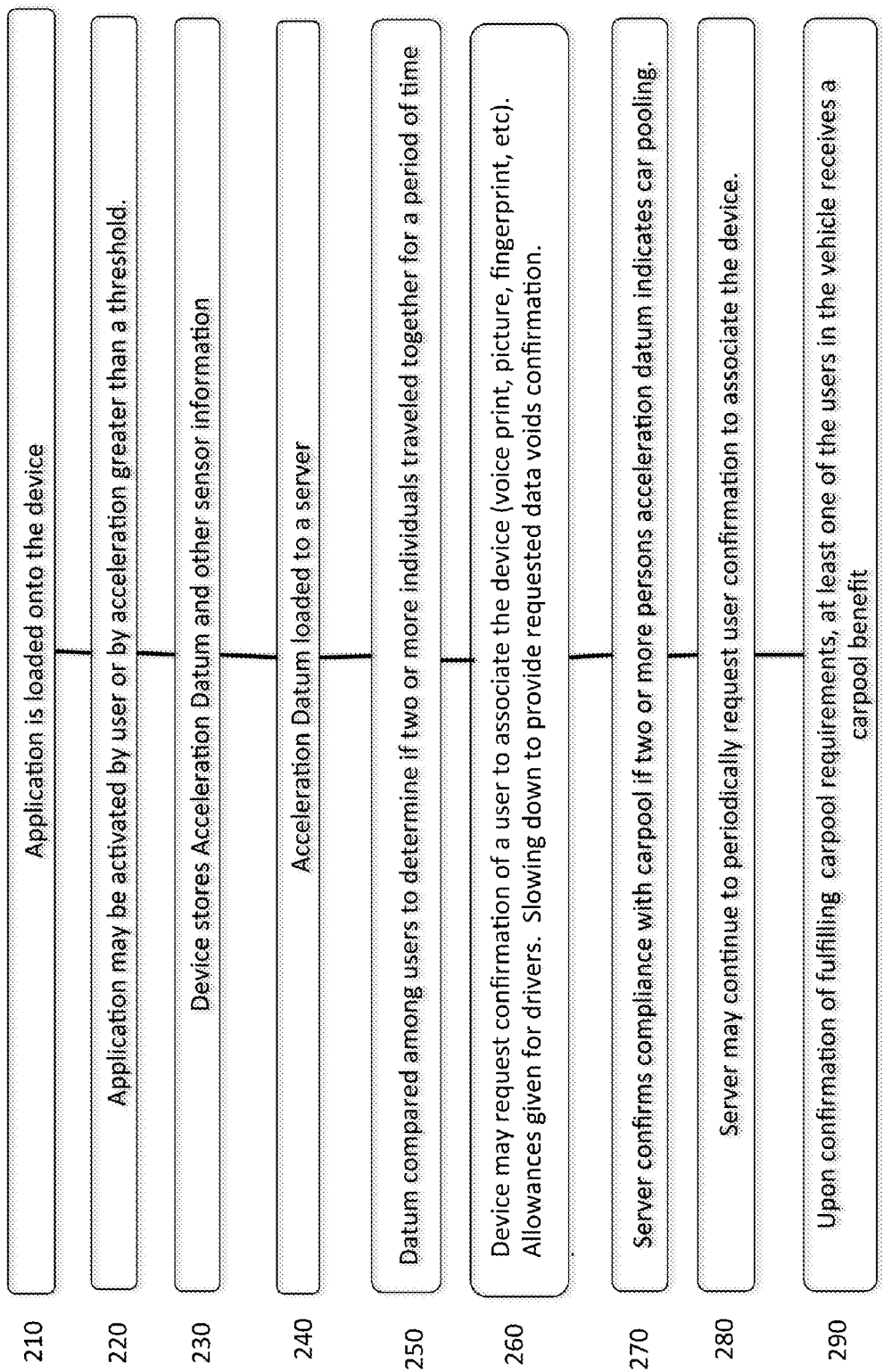
FIG. 2B is a flow diagram of one embodiment of a method that confirms that two or more passengers have traveled together in the same vehicle for a period of time to satisfy the relevant carpool requirements.

FIG. 2B is a flow chart of one embodiment of a method 200 that may be used with the disclosed invention. In one embodiment, in step 210, a software or application 180 may be loaded into device 100. The application 180 may be loaded by the device (of a user) by downloading from a server, or by copying the software from another device. The application 180 may be loaded onto the device during manufacture process or may be loaded by the device without user intervention. The software or application loaded may be stored in memory 120.

In one embodiment, the application 180 may be activated in step 220 by time of day, by a user action such as a user interface input, by acceleration exceeding a threshold, or by other predetermined activation thresholds. In another embodiment, the software application 180 may run all or most of the time that the device 100 is operating.

When the application 180 is running in step 230, in one embodiment, carpool data such as acceleration, motion, sensor, or position data from the accelerometer 160 may be recorded by device 100 in memory 120. In another embodiment, when the application 180 is running in step 230, the carpool data such as acceleration, motion, sensor, or position data from the accelerometer 160 or data from other sensors may be utilized or retrieved by device 100 if such data is already recorded or collected by accelerometer 160 or other sensor or components of the device.

In another embodiment, carpool data may come from other sensors such as a compass, barometer, location data, fingerprint data, or camera data. In other embodiments, carpool data may be stored or retrieved for example, when the acceleration of the user exceeds a predetermined threshold, if the user changes direction, based on a timer such as every 15 seconds, or by a combination of the above. In one embodiment, the carpool data from the accelerometer may be stored or retrieved every 15 seconds if the data exceeds the threshold. In another embodiment, the carpool data may be stored or retrieved with a time stamp to indicate the time of day corresponding to each data point.

In other embodiments, the carpool data, such as acceleration data may have already been independently recorded or collected by the device or a component of the device, with or without the presence, activation or installation of Application 180. And such data may be utilized or retrieved by device 100 or the server to compare with data collected from other devices and to determine whether the user of the device is carpooling or has carpooled with other individuals.

In some embodiments, the recorded, collected, retrieved or transmitted carpool data may include one or more of the following: acceleration data; movement data, location data, information on the time and/or location that the acceleration was taken; data from an electronic compass; data from GPS; information about the connections of the transceiver such as identity of a connected wifi access point, base station ID; data from a camera; data from a barometer; data from another sensor 170 contained or connected to device 100. For the purpose of this application, the each and all of the carpool data described above, the preexisting carpool data already stored on a device, or other data that can be collected or utilized for the purpose of confirming participation in a carpool is referred to as "acceleration datum."

In one embodiment, in step 240, the acceleration datum stored in device 100 is loaded to a server. The acceleration datum may be loaded at a time chosen by the user, or may be polled by the server based on user input or a predetermined threshold. The acceleration datum may be transmitted by the transceiver 140 to a server. The acceleration datum may be uploaded to a server at a specific time of day, when the file to be loaded exceeds a predefined size, or by any other means that is known in the art. The user may or may not be aware that the acceleration datum is being sent or has been sent to the server.

The server, for the purpose of this application, is any computer, terminal, web server, a virtual server in the cloud that may be put into communication with the device 100, or another mobile device such as a device with the functionality of device 100. The server may be located remotely from device 100 and may be connected through a path that includes the Internet.

In one embodiment, in step 250, acceleration datum collected from multiple users may be compared and correlated in the server to produce a comparison. By comparing the data from multiple users, the server can determine if two or more individual users shared a conveyance such as a vehicle or train. If two or more individuals traveled together in a single vehicle, the acceleration data (which includes movement data) from these individuals would match within measurement error as when the vehicle accelerated, braked, and/or turned, therefore producing a matching comparison. Two individuals in two different vehicles closely following each other would have differences in time stamped acceleration and movement data or other acceleration datum to produce non-matching comparison. Measurement error in this context has the standard industry meaning, which refers to observational error, which is the difference between a measured value of quantity and its true value that results as an inherent part of things being measured and of the measurement process.

In one embodiment, in step 260, the device 100 may request confirmation of an individual's presence in the carpooling vehicle to authenticate that the device is associated with that specific individual or confirm the individual's identity who is using the device. This may be necessary to determine that the two or more users are actually riding in one single vehicle together and not just one individual using two devices 100. In one embodiment, a device may authenticate the association of the user with the device by requesting that each user in the shared vehicle take a picture of him or herself, scan a fingerprint, speak to the device to confirm a voiceprint, or otherwise request a form of user input or sensor data to confirm presence of each of the individuals in the shared vehicle. In one embodiment, the device 100 may choose to wait and request the confirmation of the driver when the vehicle is not moving or being stationary. It may not be desirable to require the individual driving the vehicle to have to confirm his or her presence and identity while the vehicle is moving. By monitoring location data, the device 100 may determine when the vehicle is moving, or when the vehicle is in a stationary position.

In another embodiment, in step 270, the server may confirm that two or more individuals participated in a carpool, if their recorded and uploaded acceleration data matched within measurement error, hereinafter referred to as a "match". For example, build tolerance of accelerometers may cause different devices to measure the same acceleration and deliver slightly different values. Similarly a handheld device, e.g., a smartphone placed right side up display towards the front on the dashboard may report a different acceleration vector then a second smartphone placed upside down with the display toward the rear. Therefore, both devices may report nearly the same magnitude, but the direction of the acceleration relative to the devices would be different. In one embodiment the acceleration direction, however, may be normalized by including the compass indication from the devices that include an electronic compass, to produce a matching result. This would enable a server to determine the direction of travel of both devices. In another embodiment, only the magnitude of the acceleration may be communicated and compared.

After confirmation of carpool, in one embodiment, in step 280, the server may continuously or periodically request confirmation of the user's presence to associate the device with a specific user or confirm the user's identity who is using the device.

Figure 2C:
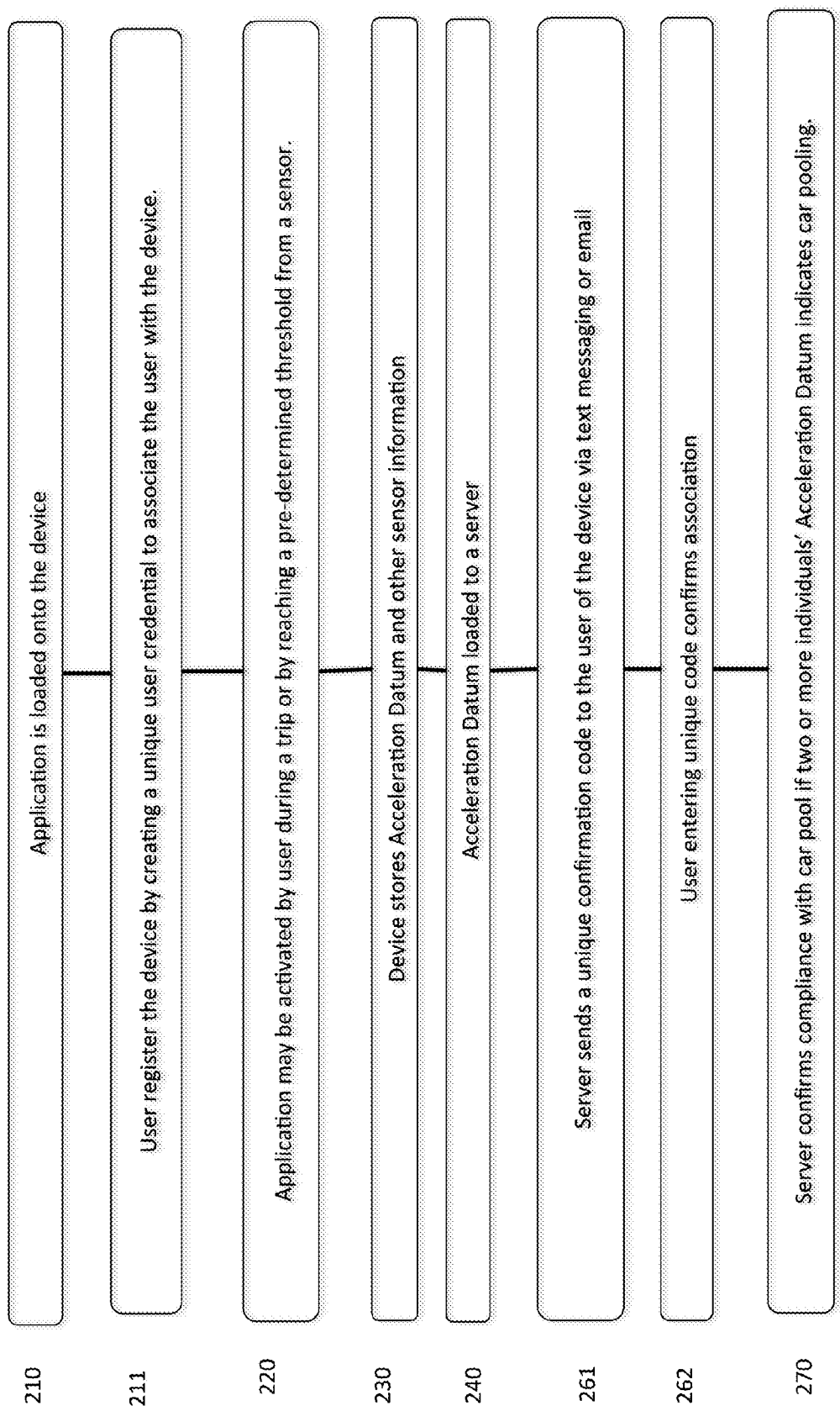
FIG. 2C is a flow diagram of another embodiment of a method that confirms that two or more passengers have traveled together in the same vehicle for a period of time to satisfy the relevant carpool requirements.

In another embodiment, as illustrated in FIG. 2C, from the initial installation in step 210, or when an individual first activates the application 180 in step 211, the user may be assigned by or prompted to register with the application either through the device 100 or the server, a unique user identification and password (collectively user credential) to associate the particularly device 100 with the specific user. Other forms of user credentials as are known in the art maybe used in place of a user name and password. In one embodiment, because of the uniqueness of the user credential, the authentication to associate a user to a specific device for the purpose of confirming carpooling, is achieved. Therefore, in this embodiment, in step 260, the server may not need to request any additional information or confirmation to confirm associate the device with one individual. In another embodiment, the user credential may be entered by the individual in step 260, while carpooling or prior to the start of the trip, to confirm the presence of the user and authenticate the association of the device to the user.

In some embodiments, in step 211, the user may register for a specific incentive or benefits or agree to certain goals related to carpooling in order to receive the incentive or benefits. The user may, for example, sign up for a carpool requirement that provides an incentive or value to the user. The incentive may require the user to carpool for example 15 days during a month.

In one embodiment, after the application is running as described in FIG. 2B and above, in step 261, server may send a unique confirmation code to the user of the device, via a communication method, such as through a text message or an email. User then may enter the code generated by server in step 262 into the device to confirm the association of the device and confirm the user's presence in the carpooling vehicle. Upon association of the device, in step 270, the server may confirm that two or more individuals participated in a carpool, and at least one of the users will receive one of the benefits associated with the carpool.

In one embodiment, the acceleration datum may be encrypted when it is stored, and the data may be encrypted when it is transmitted from device 100 to the server. The encryption may be public key encryption using the public key such as for the server. The server would be able to decrypt the data using a private key associated with the server. Many other methods of encryption that are known in the art can be used in conjunction with the present invention as well.

In an embodiment, the data transmitted to the server in step 240 may be streamed by the device in real time or with a delay. The data may be stored in the device and uploaded to the server in one or more packets.

In an embodiment, the server may transmit a predetermined or preset threshold to a device 100. Device 100 may operate to collect one or more acceleration datum if the magnitude of the data exceeds the predetermined threshold. This is a method for the server to reduce the amount of data collected by device 100 and transmitted to the server. By eliminating data less than a threshold the acceleration datum set will be reduced, requiring less memory space for storage and less bandwidth from the transceiver to communicate the acceleration datum to from the device to the server.

Figure 3:
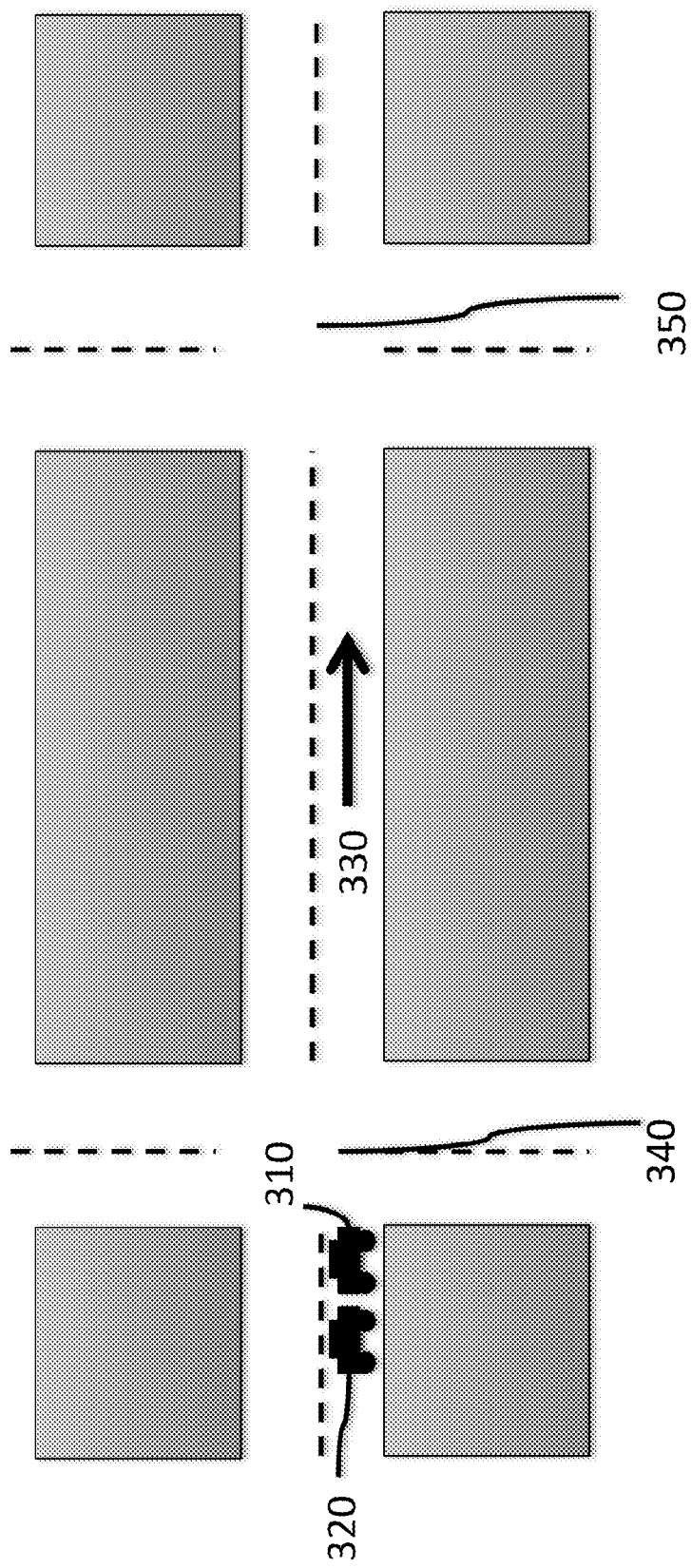
FIG. 3 illustrates two vehicles driving between intersections to demonstrate an embodiment of the method that confirms that two or more passengers have traveled together in the same vehicle for a period of time to satisfy the relevant carpool requirements.

FIG. 3 depicts a road with a first intersection 340 and a second intersection 350. First vehicle 310 begins stopped at the intersection for a traffic light. Second vehicle 320 is behind the first vehicle 310. First vehicle 310 has two passengers, Alice and Becky, therefore it is a carpooling vehicle for the purpose of this illustration. Second vehicle 320 has a single passenger Charlie, and is not a carpooling vehicle. Alice, Becky, and Charlie each have a device such as device 100 capable of recording acceleration datum, collect and transmit any carpool data described above.

Figure 4:
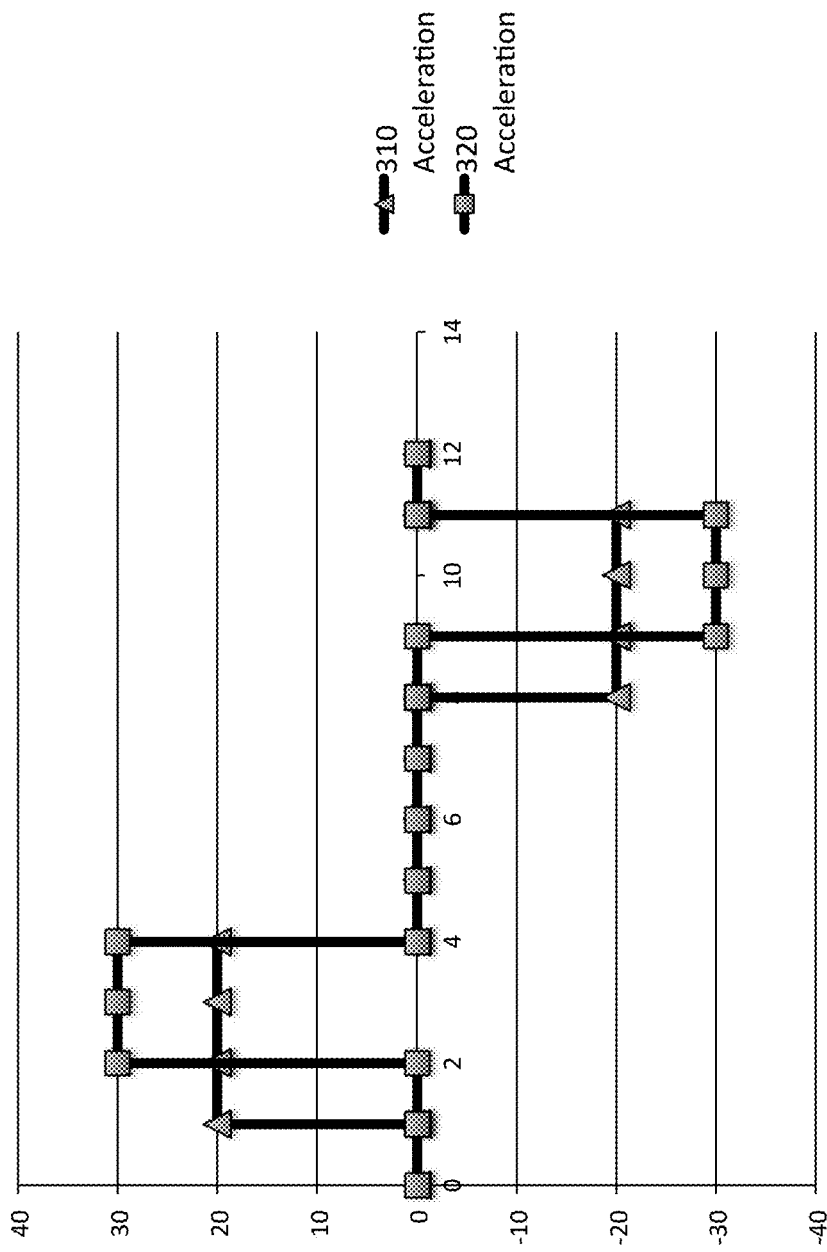
FIG. 4 graphically depicts acceleration data associated with FIG. 3 which may be used in conjunction with the embodiments described herein.

The traffic light turns green and Alice and Becky's vehicle 310 accelerates through the first intersection 340 in the direction of travel indicated by 330. FIG. 4 graphically shows the acceleration of carpooling vehicle 310 and second vehicle 320. At time=1 Alice and Becky's vehicle begins accelerating at 20 units/sec$^2$, at time=2 second vehicle 320 begins to accelerate at 30 units/sec$^2$. Alice and Becky's carpooling vehicle accelerates for 3 seconds, while Charlie's vehicle accelerates for 2 seconds. At time equals to 8 seconds carpooling vehicle 310 begins to decelerate at −20 units/sec$^2$. Note that if only the magnitude of the acceleration was being recorded, the deceleration would be graphed as positive numbers. The second car begins to brake at time equals 11 seconds at a rate of −30 units/sec$^2$.

When the acceleration data recorded by the three devices, associated with each individual, Alice, Becky, and Charlie respectively, is loaded into a server and compared, the data from Alice and Becky should correlate within measurement tolerance of the accelerometer and time base of their devices, while the data from the device associated with Charlie will be different as shown in FIG. 4.

Figure 5:
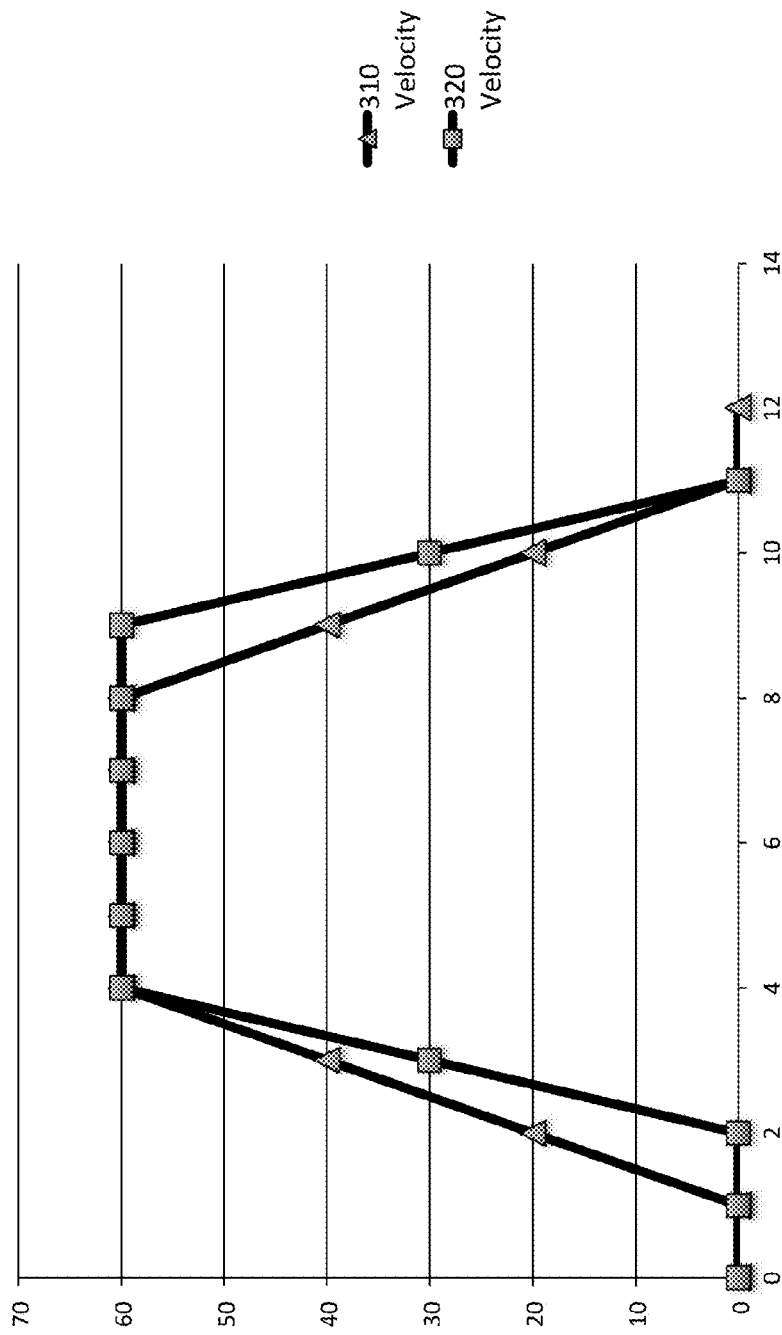
FIG. 5, graphically depicts velocity data associated with FIG. 3 which may be used in conjunction with the embodiments described herein.

FIG. 5, alternatively, shows the velocity versus time data from Alice and Becky from the carpooling vehicle 310 and Charlie in the second vehicle 320. As can be seen in the graph, the velocity of the two vehicles shows differences, which can be detected in a server to determine that the individuals in vehicle 310 are traveling in the same vehicle, while the individual from vehicle 320 is not traveling with the other individuals.

Figure 6:
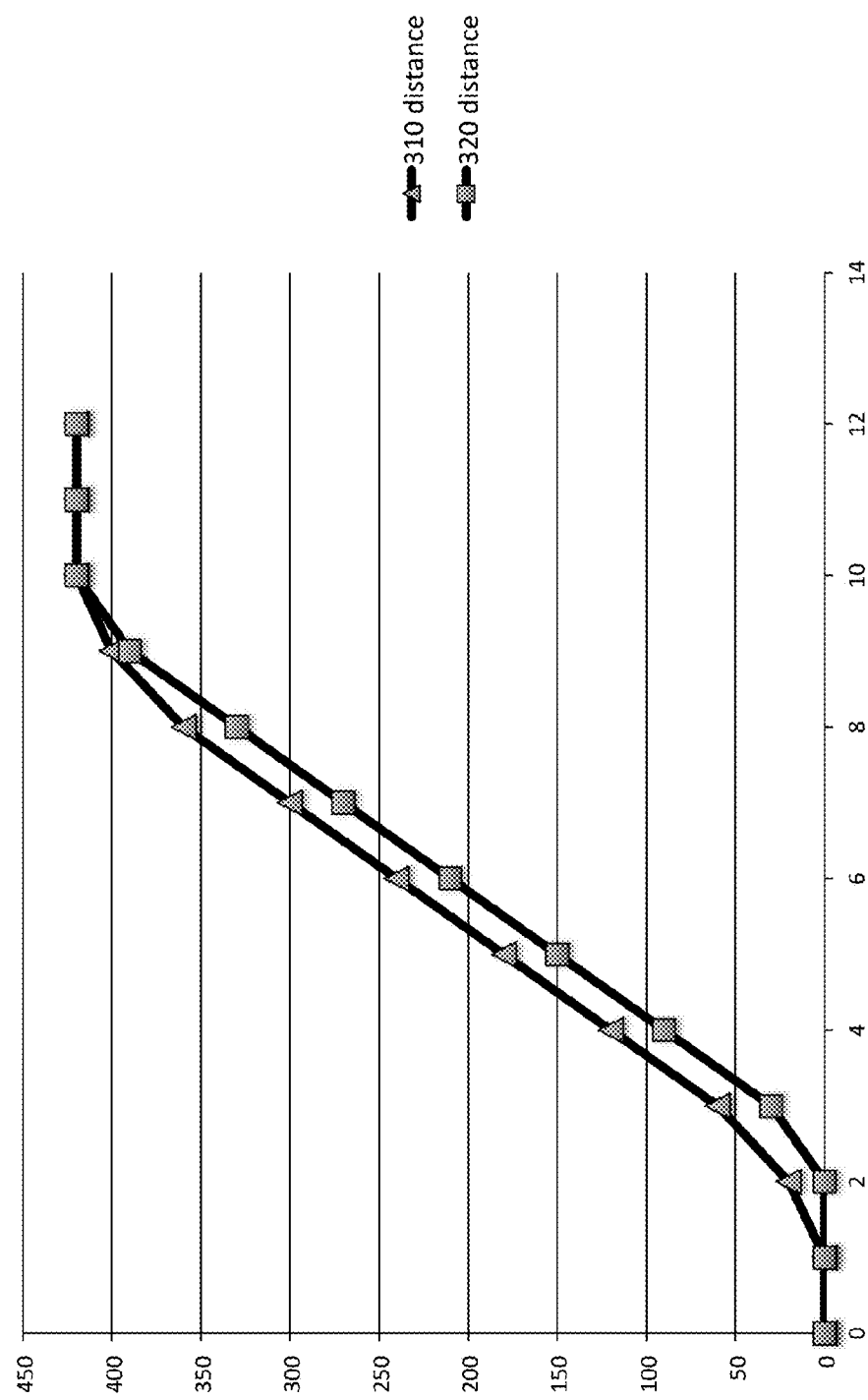
FIG. 6, graphically depicts distance traveled data associated with FIG. 3 which may be used in conjunction with the embodiments described herein.

FIG. 6, in another alternative, shows distance traveled versus time from vehicles 310 and 320 based on the data collected from the three individuals. As can be seen in the graph, the distance traveled of the two vehicles shows differences that can be detected in a server to determine which individuals are traveling in the same vehicle.

In some embodiments, in step 220, a first user may register whom the user may travel with and the time that the user travels with the other users, such as a second and/or third individual. Acceleration datum may be stored during the time that the user indicates he or she will be traveling with another individual. The software or the server may use the information and confirm that all of the users have indeed traveled together in one single vehicle.

In some embodiments, velocity information may be recorded in addition to acceleration data or instead of acceleration data. The velocity data may include direction of travel, or may just include the magnitude of the speed. By comparing the magnitude of the velocity, or the velocity including direction from different individuals, it may be determined that a subset of the users have traveled together in one single vehicle.

In some embodiments, the location information of device 100 may be recorded at different points in time. The location information may be compared from different users to determine that a subset of users may have traveled together in one single vehicle.

In some embodiments the server may request at least some of acceleration, velocity, and/or location information to determine if multiple users have traveled together in one single vehicle.

In some embodiments, the acceleration datum may be stored if the user moves at a speed such as 20 mph or faster, indicating that the user is on a conveyance such as traveling in a vehicle or train.

In other embodiments, the server, either on its own, or pursuant to a predetermined user setting, may only request magnitude information of velocity and/or acceleration. Without requesting the location information, the anonymity of the users' location may be preserved, since it would be more difficult to determine the users' location with magnitude data only.

In some embodiments, the acceleration datum loaded may not include direction. By including acceleration without direction, the privacy of the location of the users can be maintained. If the data shared with the server includes only the acceleration magnitude and a measure of time, then confirmation that users have traveled together in one single vehicle can be confirmed without revealing details of the users location.

In some embodiments a device 100 may cause acceleration datum to be communicated to a server. The acceleration datum may include at least one of acceleration magnitude, acceleration direction, velocity with direction, speed without direction, distance traveled, location, time, or identity of the device. The server may compare the one or more set of acceleration datum collected from the devices to determine if two or more individuals have traveled together in a single vehicle, or if one or more individuals have traveled on a the same public transportation.

The described methods enable separate individuals to confirm that they are participating in carpools, riding trains, buses, or other means of public transportation.

In some embodiments, upon the confirmation that two or more individuals have traveled together for a period of time in a single vehicle, the server may determine whether the carpool requirements corresponding to certain benefit has been fulfilled. Upon confirmation of the individuals' required carpool status, the carpool incentives and benefit can be properly distributed or administered, and the proper carpooling individuals can be awarded credit or benefits for their participation. In one embodiment, in step 290, at least one user receives the benefit of the carpooling upon confirmation of the carpool requirement. If the user was participating in an incentive program such as a program registered during step 211, then once the server confirms the requirements of the program the incentive would be granted or administered to that user.

In another embodiment, a first user may carpool with a first group of individuals during a first set of days and may carpool with a second group of individuals during a second set of days. Once the first user meets the requirements of the incentive program the incentive would be bestowed on the first user.

Other embodiments of the present disclosure will be apparent to those skilled in the art from consideration of the specification and practice of the embodiments disclosed herein. It is intended that the specification and examples be considered as exemplary only, with a true scope and spirit of the disclosure being indicated by the following claims.

We claim:

1. A computer-implemented method of determining that two or more individuals traveled or are traveling together in one single vehicle, the method comprising a processor executing instructions causing the processor to perform:
   retrieving first acceleration datum from a first device associated with a first individual;
   retrieving second acceleration datum from a second device associated with a second individual;
   comparing the first acceleration datum and second acceleration datum to produce a comparison;
   based on the comparison, determining that the first individual associated with the first device and the second individual associated with the second device traveled together for a period of time in one single vehicle; and
   confirming that the single vehicle is eligible for an incentive associated with carpooling.

2. The method of claim 1, wherein the first acceleration datum and second acceleration datum comprises one or more of magnitude data with directional data and magnitude data without directional data.

3. The method of claim 1, further comprising
   providing a predetermined threshold acceleration target to the first device associated with the first individual, wherein the first device is configured to begin recording or retrieving acceleration datum upon detecting that an acceleration of the vehicle equals or exceeds the threshold acceleration target.

4. The method of claim 3, further comprising:
   a predetermined timer coupled with the first device associated with the first individual, wherein the first device is further configured to retrieve or record acceleration datum upon detecting that the predetermined timer has expired.

5. The method of claim 1, further comprising authenticating the first individual associated with the first device.

6. The method of claim 5, wherein the authenticating is performed by one or more of voiceprint matching, fingerprint matching, facial recognition, passcode, or a user credential confirmation.

7. The method of claim 5, wherein the authenticating is achieved by first detecting that the vehicle the first individual is riding in is one of moving or stationary.

8. The method of claim 1, further comprising determining that the first individual and the second individual have been traveling in a conveyance in one single vehicle for a period of time or have satisfied a carpool requirement.

9. The method of claim 1, wherein one or more of the first individual and the second individual receives a benefit for traveling together with another individual in one single vehicle.

10. The method of claim 1, wherein the first acceleration datum and second acceleration datum include one or more of acceleration data, movement data, location data, time, data from an electronic compass, data from GPS, transceiver connection information, data from a camera, data from a barometer, or sensor data.

11. The method of claim 10, wherein the transceiver connection information comprises identity of a connected Wi-Fi access point or base ID.

12. A computer-implemented method of confirming that two or more individuals participated or are participating in a carpool comprising:
   receiving registration information from a first device and a second device, wherein a first individual is associated with the first device and a second individual is associated with the second device;

receiving first acceleration data from the first device;

receiving second acceleration data from the second device;

comparing the first acceleration data and the second acceleration data to produce a comparison;

based upon the comparison, confirming that the first individual and second individual have traveled together in one single vehicle for a period of time and thus participated in the carpool; and confirming that the single vehicle is eligible for an incentive associated with carpooling.

13. The method of claim 12, wherein one or more of the first acceleration data and second acceleration data indicates that at least one of the first or second devices is moving greater than a predetermined threshold acceleration rate.

14. The method of claim 13, where the threshold acceleration rate is 0.5 meters per second.

15. The method of claim 12, wherein the first and second acceleration data are compensated for gravity to determine a movement of the vehicle.

16. An apparatus for confirming that two or more individuals traveled or are traveling together in one single vehicle, the apparatus comprising:
    a processor;
    a transceiver configured to transmit and receive acceleration datum;
    a sensor configured to detect events related to the acceleration data; and
    a non-transitory computer-readable medium having a plurality of instructions stored thereon, the plurality of instructions executable by the processor, the instructions for:
        recording, storing or retrieving acceleration datum;
        authenticating an individual user associating with the apparatus;
        transmitting the acceleration datum;
        confirming that the user of the apparatus traveled together for a period of time with one or more other individuals in one single vehicle; and
        confirming that the single vehicle is eligible for an incentive associated with carpooling.

17. The apparatus of claim 16, wherein the datum is transmitted to a server, wherein the server is configured to compare the acceleration datum to data received from one or more additional devices; and
    determine that the individual user of the apparatus traveled together for a period of time with other individuals in one single vehicle.

18. The apparatus of claim 17, wherein the user of the apparatus receives a corresponding carpool benefit for traveling together with other individuals in one single vehicle.

19. The apparatus of claim 16, further comprising an accelerometer.

20. The apparatus of claim 16, further comprising a GPS.

* * * * *